(12) United States Patent
Tanaka

(10) Patent No.: US 9,211,624 B2
(45) Date of Patent: Dec. 15, 2015

(54) VIBRATION DETERMINATION METHOD AND VIBRATION DETERMINATION DEVICE

(75) Inventor: Takaaki Tanaka, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 418 days.

(21) Appl. No.: 13/457,802

(22) Filed: Apr. 27, 2012

(65) Prior Publication Data

US 2012/0318062 A1 Dec. 20, 2012

(30) Foreign Application Priority Data

Jun. 16, 2011 (JP) ................................. 2011-134382

(51) Int. Cl.
*G01H 13/00* (2006.01)
*B23Q 17/09* (2006.01)

(52) U.S. Cl.
CPC .................................. *B23Q 17/0976* (2013.01)

(58) Field of Classification Search
CPC .................................................. B23Q 17/0976
USPC ......................................................... 73/579
See application file for complete search history.

(56) References Cited

U.S. PATENT DOCUMENTS

| | | | | |
|---|---|---|---|---|
| 5,768,137 A | * | 6/1998 | Polidoro et al. | 700/186 |
| 8,014,903 B2 | * | 9/2011 | Inagaki | 700/280 |
| 8,256,590 B2 | * | 9/2012 | Suzuki et al. | 188/379 |
| 2008/0121076 A1 | * | 5/2008 | Gerdes et al. | 82/1.11 |
| 2008/0234964 A1 | | 9/2008 | Miyasaka et al. | |
| 2008/0289923 A1 | * | 11/2008 | Suzuki et al. | 188/379 |
| 2009/0069927 A1 | * | 3/2009 | Suzuki et al. | 700/177 |
| 2009/0110499 A1 | * | 4/2009 | Inagaki | 408/143 |
| 2009/0254672 A1 | * | 10/2009 | Zhang | 709/231 |
| 2010/0010662 A1 | * | 1/2010 | Inagaki | 700/175 |
| 2010/0025904 A1 | * | 2/2010 | Okanda | 269/20 |
| 2010/0104388 A1 | * | 4/2010 | Suzuki et al. | 409/131 |
| 2011/0135415 A1 | * | 6/2011 | Hamaguchi et al. | 409/79 |

FOREIGN PATENT DOCUMENTS

| | | | |
|---|---|---|---|
| CN | 101310921 A | | 11/2008 |
| DE | 102008037942 | * | 3/1989 |
| DE | 102008037942 | * | 3/2009 |
| JP | 08-145779 A1 | | 6/1996 |
| JP | 2006-234786 A1 | | 9/2006 |
| JP | 2008-290186 A1 | | 12/2008 |
| JP | 2010105160 | * | 5/2010 |

OTHER PUBLICATIONS

Japanese Office Action (Application No. 2011-134382) dated Sep. 29, 2014.
Chinese Office Action (With English Translation), Chinese Application No. 201210199739.0, dated Aug. 5, 2015 (22 pages).
Chinese Office Action (Application No. 201210199739.0) dated Aug. 5, 2015.

* cited by examiner

*Primary Examiner* — Jacques M. Saint Surin
(74) *Attorney, Agent, or Firm* — Burr & Brown, PLLC

(57) ABSTRACT

Determination of chatter vibration is done for a plurality of peak values that appears when frequency-domain vibrational acceleration is obtained through fast Fourier analysis on time-domain vibrational acceleration. In machining at a low rotation speed and machining using a tool with small flute number in particular, a type of chatter vibration that has occurred can be accurately determined, and "natural type vibration" occurring due to friction between a tool and a workpiece and an impact force caused by machining can also be determined.

10 Claims, 7 Drawing Sheets

VIBRATION DETERMINATION METHOD AND VIBRATION DETERMINATION DEVICE

CROSS-REFERENCE TO RELATED APPLICATION

This application claims the benefit of Japanese Patent Application Number 2011-134382 filed on Jun. 16, 2011, the entirety of which is incorporated by reference.

BACKGROUND OF THE INVENTION

1. Field of the Invention

The present invention relates to a vibration determination method for determining the type of chatter vibration occurring in a machine tool during machining performed by rotating a tool or a workpiece during machining, and a vibration determination device for executing the vibration determination method.

2. Description of Related Art

In a machine tool performing machining by rotating a rotary shaft, so-called chatter vibration may possibly occur during machining due to improper machining conditions such as depth of cut and rotation speed of the rotary shaft, and the like. When the chatter vibration occurs, finishing accuracy of the machined surface may be reduced and the tool may be broken. Therefore, suppression of the chatter vibration is required.

There are two types of chatter vibration, namely, "regenerative chatter vibration" which is self-induced vibration occurring between a tool and a workpiece, and "forced chatter vibration" in which the machine tool itself becomes a source of vibration. Prior to the present application, the applicant devised a vibration suppression device (Japanese Unexamined Patent Application Publication No. 2008-290186) that discriminates the two types of chatter vibration so that respective countermeasures can be taken for the two types of chatter vibration. In the vibration suppression device described in Japanese Unexamined Patent Application Publication No. 2008-290186, frequency-domain vibrational acceleration is obtained through FFT-analysis on time-domain vibrational acceleration detected by vibration sensors, and the frequency at which the frequency-domain vibrational acceleration becomes maximum is obtained as the chatter frequency fc. Then, k' number, k number, and phase difference $\epsilon$ are calculated according to formulae (1) to (3) below to determine "forced chatter vibration" when the phase difference $\epsilon$ is close to 0 (0.1 or less, for example), that is, the case k' number is close to an integer, and to determine "regenerative chatter vibration" otherwise. In other words, when machining is performed at the rotation speed Sa of the rotary shaft using a tool having such vibration characteristics as shown in FIG. 7 for example and if "forced chatter vibration" occurs, as shown in a graph of FIG. 6, a value of an integral multiple of a fundamental frequency (a value close to an integral multiple in actual machining) is detected as the chatter frequency. Therefore, the case the phase difference $\epsilon$ takes a value close to an integral multiple of the fundamental frequency is determined as "forced chatter vibration."

[FORMULAE]

$$k' = 60 \times fc/(Z \times S) \quad (1)$$

$$k = \lfloor k' \rfloor \quad (2)$$

$$\epsilon = k' - k \quad (3)$$

In the formula (1), Z represents the number of tool flutes, and S represents the rotation speed of the rotary shaft in terms of the revolutions per minute. In the formula (2), $\lfloor x \rfloor$ represents a floor function expressing a maximum integer smaller than x (that is, according to the formula (2), an integral portion of k' number is obtained).

However, when the rotation speed of the rotary shaft is low and if machining is performed using a tool with small number of flutes, as shown in an area a (the area of low rotation speed) in the graph of FIG. 6 for example, the interval of the chatter frequency which is the integral multiple of the fundamental frequency becomes dense. In other words, in such a machining condition, the chatter frequency hardly differs between "forced chatter vibration" and "regenerative chatter vibration". Therefore, when the chatter vibration is determined using only the maximum value in the frequency-domain vibrational acceleration as described in Japanese Unexamined Patent Application Publication No. 2008-290186, determination accuracy between "forced chatter vibration" and "regenerative chatter vibration" may become poor in the machining condition described above.

Further, with respect to "forced chatter vibration," in addition to "synchronizing type vibration" in which the chatter frequency takes the values of the integral multiples of the fundamental frequency as described above, there is "natural type vibration" occurring at a frequency in the vicinity of the natural frequency of the machine tool body, tool, workpiece and the like due to friction between the tool and the workpiece and an impact force caused by machining. The chatter frequency of such "natural type vibration" is not stable. That is, when the frequency-domain vibrational acceleration is obtained through FFT-analysis on the time-domain vibrational acceleration, the maximum value thereof appears in the vicinity of the natural frequency of the machine tool body and the tool system, and the frequency that takes the maximum value is not constant. Accordingly, there is also a problem that "natural type vibration" cannot be determined when only the maximum value of the frequency-domain vibrational acceleration is made an object as described in Japanese Unexamined Patent Application Publication No. 2008-290186.

The present invention has been developed under the circumstance, and its object is to provide a vibration determination method and a vibration determination device capable of determining the type of the chatter vibration more accurately than done in the prior art.

SUMMARY OF THE INVENTION

In order to achieve the object, a first aspect of the present invention is a vibration determination method for determining a type of chatter vibration occurring in a rotary shaft in a machine tool that has the rotary shaft rotating a tool or a workpiece. The vibration determination method includes a first step for detecting time-domain vibration of the rotary shaft and rotation speed of the rotary shaft during rotation, a second step for calculating frequency-domain vibration based on the time-domain vibration, and obtaining a plurality of peak values and peak frequencies taking the peak values in the calculated frequency-domain vibration, a third step for obtaining a synchronizing type vibration range for determining the type of the chatter vibration using the peak frequency corresponding to each of the peak values, and a fourth step for determining the type of the chatter vibration based on a relation between the peak frequencies corresponding to the peak of each peak value and the synchronizing type vibration range obtained using the peak frequencies.

In order to achieve the object, a second aspect of the present invention is a vibration determination method for determining a type of chatter vibration occurring in a rotary shaft in a machine tool that has the rotary shaft rotating a tool or a workpiece. The vibration determination method includes a first step for detecting time-domain vibration of the rotary shaft and rotation speed of the rotary shaft during rotation, a second step for calculating frequency-domain vibration based on the time-domain vibration, and obtaining a plurality of peak values and peak frequencies corresponding to each of the peak values in the calculated frequency-domain vibration, a third step for obtaining a natural type vibration range for determining the type of the chatter vibration based on the plurality of peak frequencies, and a fourth step for determining the type of the chatter vibration based on the number of the peak values having corresponding peak frequencies that are included in the natural type vibration range.

A third aspect of the present invention is the vibration determination method according to the second aspect of the present invention in which, in the third step, an interval between frequencies taking the peak values is obtained, and the natural type vibration range is obtained after exclusion of the peak values corresponding to one of a rotation period of the rotary shaft and integral multiples thereof, and a flute passage period of the tool obtained by a formula (7) and/or a formula (8) below from the calculated frequency out of the peak domain vibration.

[FORMULAE]

$$\text{Rotation frequency} = \text{rotation speed of a rotary shaft}/60 \quad (7)$$

$$\text{Flute-passage frequency} = \text{rotation speed of a rotary shaft} \times \text{number of tool flutes}/60 \quad (8)$$

In order to achieve the object, a fourth aspect of the present invention is a vibration determination device that determines, in a machine tool having a rotary shaft rotating a tool or a workpiece, a type of chatter vibration occurring when the rotary shaft is rotated. The vibration determination device includes a detection unit for detecting time-domain vibration of the rotary shaft and rotation speed of the rotary shaft during rotation, an FFT calculation unit for calculating frequency-domain vibration based on the time-domain vibration detected by the detection unit, and obtaining a plurality of peak values and peak frequencies corresponding to the peak values in the calculated frequency-domain vibration, a determination unit for obtaining a synchronizing type vibration range for determining the type of the chatter vibration using the peak frequency corresponding to the peak of each peak value, and determining the type of the chatter vibration based on a relation between the peak frequencies and corresponding peak values and the synchronizing type vibration range obtained using the peak frequencies, and a display unit for displaying the type of the chatter vibration determined.

In order to achieve the object, a fifth aspect of the present invention is a vibration determination device that determines, in a machine tool that has a rotary shaft rotating a tool or a workpiece, a type of chatter vibration occurring when the rotary shaft is rotated. The vibration determination device includes a detection unit for detecting time-domain vibration of the rotary shaft and rotation speed of the rotary shaft during rotation, an FFT calculation unit for calculating frequency-domain vibration based on the time-domain vibration detected by the detection unit, and obtaining a plurality of peak values and peak frequencies corresponding to the peak of each peak value in the calculated frequency-domain vibration, a determination unit for obtaining a natural type vibration range for determining the type of the chatter vibration based on the plurality of peak frequencies, and determining the type of the chatter vibration based on the number of the peak values having corresponding peak frequencies that are included in the natural type vibration range, and a display unit for displaying the type of the chatter vibration determined.

According to the present invention, a plurality of peak values and peak frequencies corresponding to the peak of each peak value in the calculated frequency-domain vibration are obtained, the synchronizing type vibration range (aspect 1) and the natural type vibration range (aspect 2) as described above are obtained based on the plurality of peak values and peak frequencies obtained, and the type of the chatter vibration is determined. Therefore, compared with the prior art in which determination is performed using only the maximum value of the frequency-domain vibrational acceleration, the type of the chatter vibration occurred can be determined more accurately in machining at a low rotation speed and machining using a tool with small flute number particularly, and "natural type vibration" that occurs due to friction between the tool and a workpiece and an impact force caused by machining can also be determined.

Further, according to the third aspect of the present invention in particular, an interval between frequencies corresponding to the peak of each peak value is obtained, and the natural type vibration range is obtained after exclusion of peak values at which the interval between frequencies becomes the rotation frequency and/or the flute-passage frequency or becomes an integral multiple thereof out of the peak values from an object of determination. Therefore more precise natural type vibration range can be obtained, and more accurate determination of "natural type vibration" becomes possible.

According to the fourth and fifth aspects of the present invention, the display device that displays the type of the chatter vibration determined is provided. Therefore, a worker can easily grasp the type of the chatter vibration occurred, quickly take effective measures according to the type, improve the accuracy of the machined surface, suppress abrasion of a tool, prevent breakage of the tool, improve the manufacturing efficiency of the product, and so on.

DETAILED DESCRIPTION OF THE INVENTION

A vibration determination method and a vibration determination device according to an embodiment of the present invention will be described in detail below based on the drawings.

Figure 1:
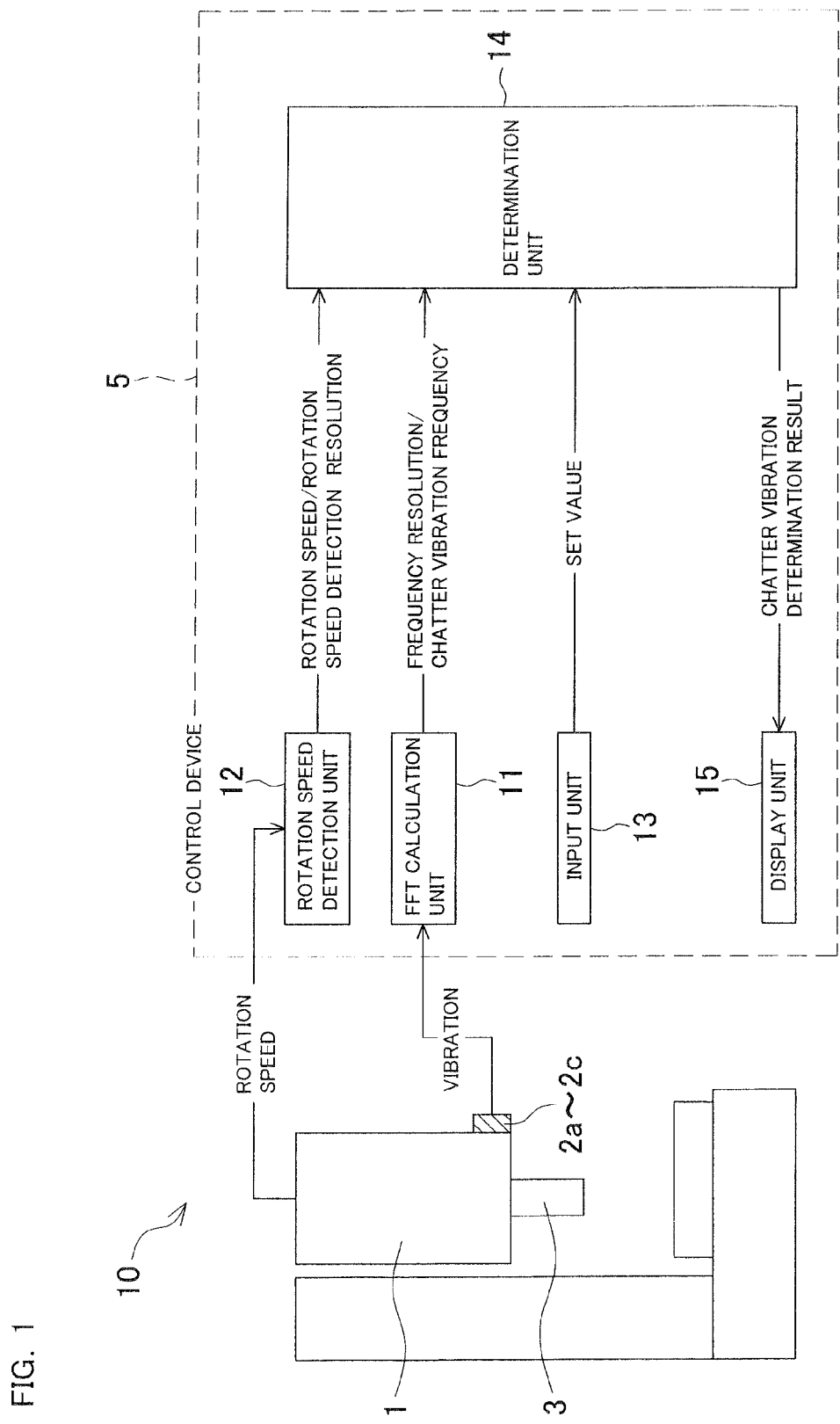
FIG. 1 is an explanatory drawing showing a block configuration of a vibration suppressing device.
Figure 2:
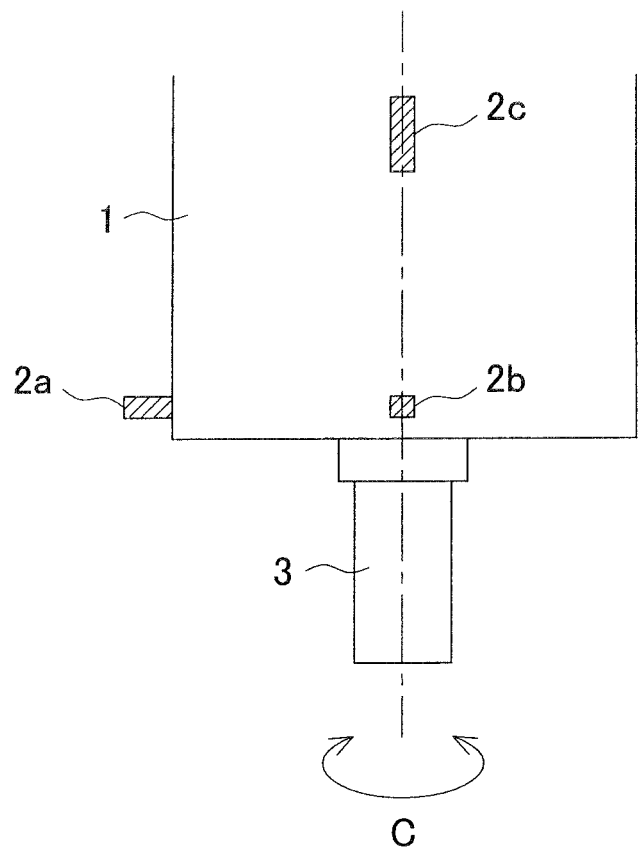
FIG. 2 is an explanatory drawing showing a rotary shaft housing of an object of suppressing vibration as seen from a side.

FIG. 1 is an explanatory drawing showing a block configuration of a vibration determination device 10. FIG. 2 is an explanatory drawing showing a rotary shaft housing 1 becoming an object of monitoring the vibration as seen from a side, and FIG. 3 is an explanatory drawing showing the rotary shaft housing 1 as seen from the axial direction.

The vibration determination device 10 determines a type of chatter vibration occurring in a rotary shaft 3 provided in the rotary shaft housing 1 so as to be rotatable around an axis C. The vibration determination device 10 includes vibration sensors 2a to 2c and a control device 5. The vibration sensors 2a to 2c detect time-domain vibrational acceleration (which means the vibrational acceleration on the time axis), which is a characteristic value accompanying the vibration occurring in the rotary shaft 3 during rotation. The control device 5 analyzes values detected by the vibration sensors 2a to 2c to determine the type of "chatter vibration", and displays the result of determination.

Figure 3:
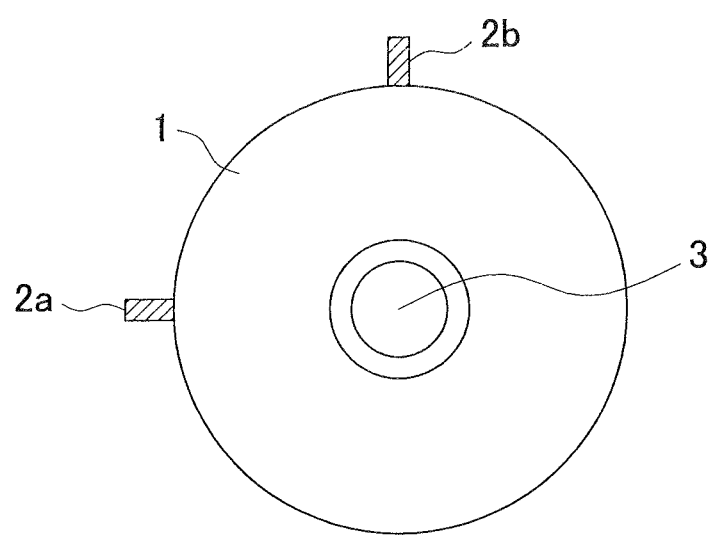
FIG. 3 is an explanatory drawing showing the rotary shaft housing as seen from the axial direction.

The vibration sensors 2a to 2c are attached to the rotary shaft housing 1 as shown in FIG. 2 and FIG. 3. One vibration sensor is configured to detect the time-domain vibrational acceleration in the direction orthogonal to other vibration sensors (for example, the vibration sensors 2a to 2c are attached to detect the time-domain vibrational acceleration in the X-axis, Y-axis, and Z-axis direction that are orthogonal to each other).

The control device 5 includes an FFT calculation unit 11, a rotation speed detection unit 12, an input unit 13, a determination unit 14, a display unit 15, and a storage unit (not illustrated), and so on. The FFT calculation unit 11 performs analysis based on the time-domain vibrational acceleration detected by the vibration sensors 2a to 2c. The rotation speed detection unit 12 detects the rotation speed of the rotary shaft 3. The input unit 13 is used by a worker to input a variety of values and the like for determining the type of the chatter vibration. The determination unit 14 determines the type of the chatter vibration that occurred. The display unit 15 displays the result of determination as described above in the determination unit 14 and the like in addition to an NC program and the present position of the machine. The storage unit stores a variety of values input through the input unit 13 and the result of determination in the determination unit 14 and the like.

Figure 4:
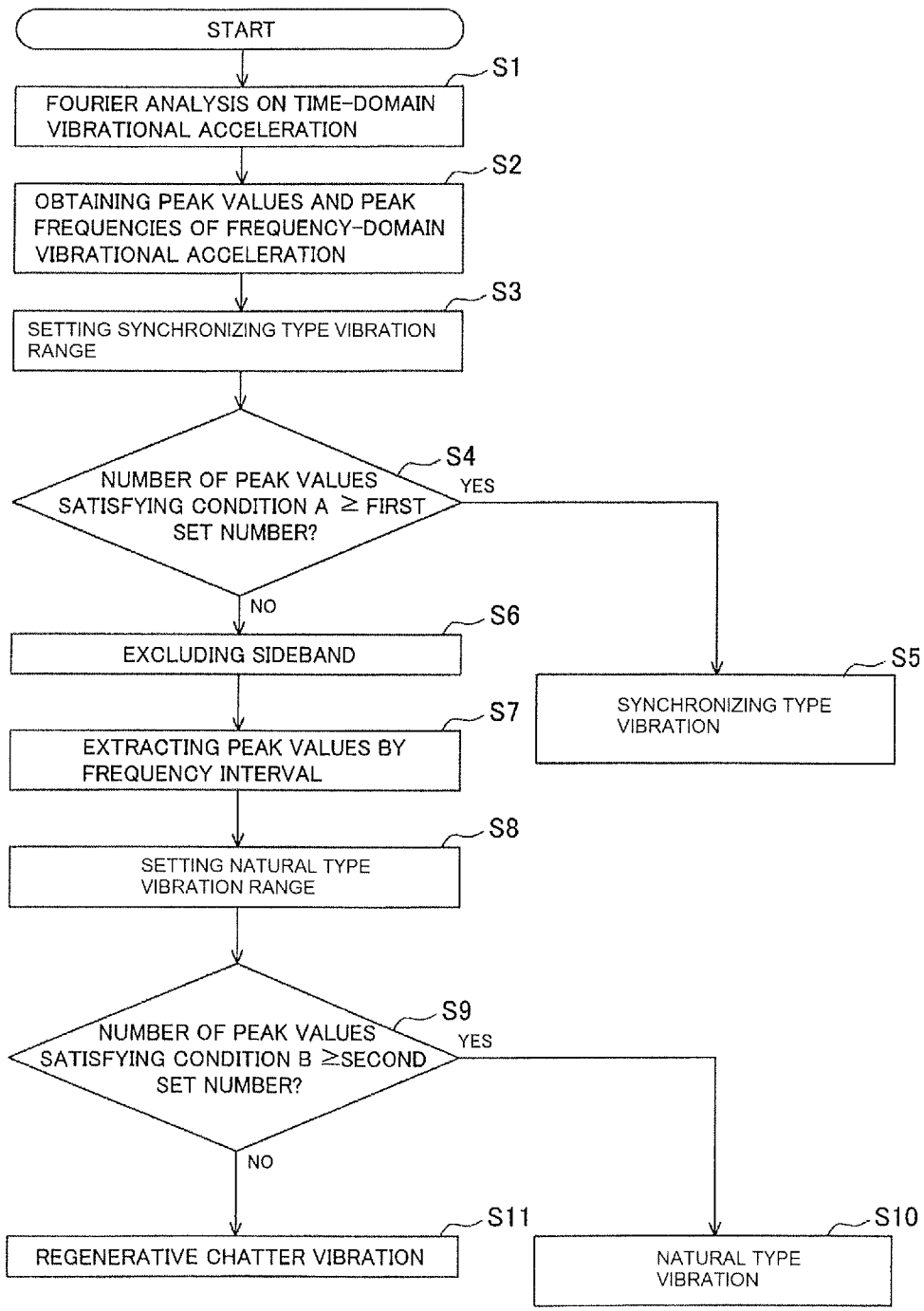
FIG. 4 is a flowchart showing on vibration determination control.

Here, vibration determination control, which is an essential part of the present invention, will be described in detail based on the flowchart of FIG. 4.

Figure 5:
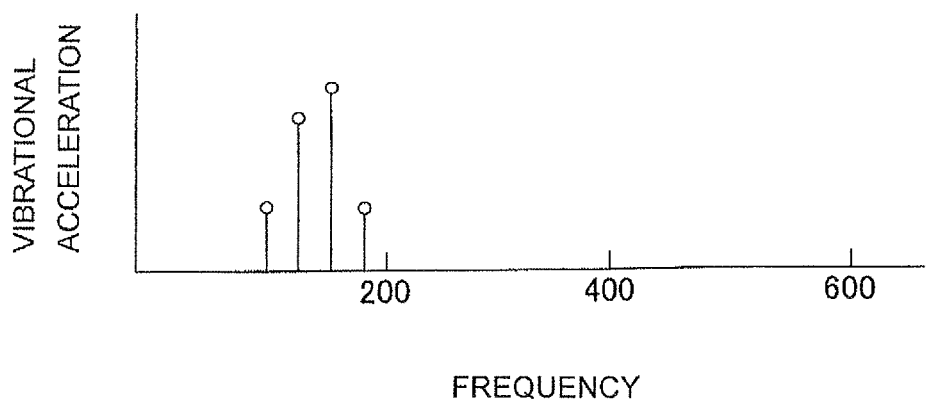
FIG. 5 is an explanatory drawing showing the peak values and the peak frequencies of the vibrational acceleration of a plurality of frequency domains obtained.
Figure 6:
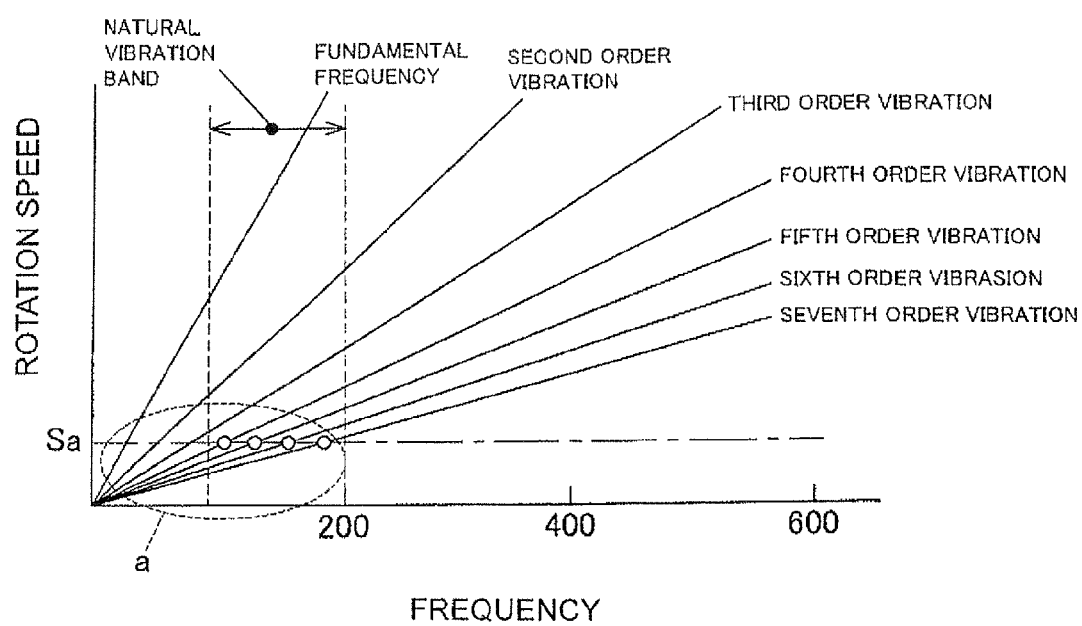
FIG. 6 is an explanatory drawing showing the relation between the rotation speed and the frequency when rotation synchronizing type forced chatter vibration occurs.
Figure 7:
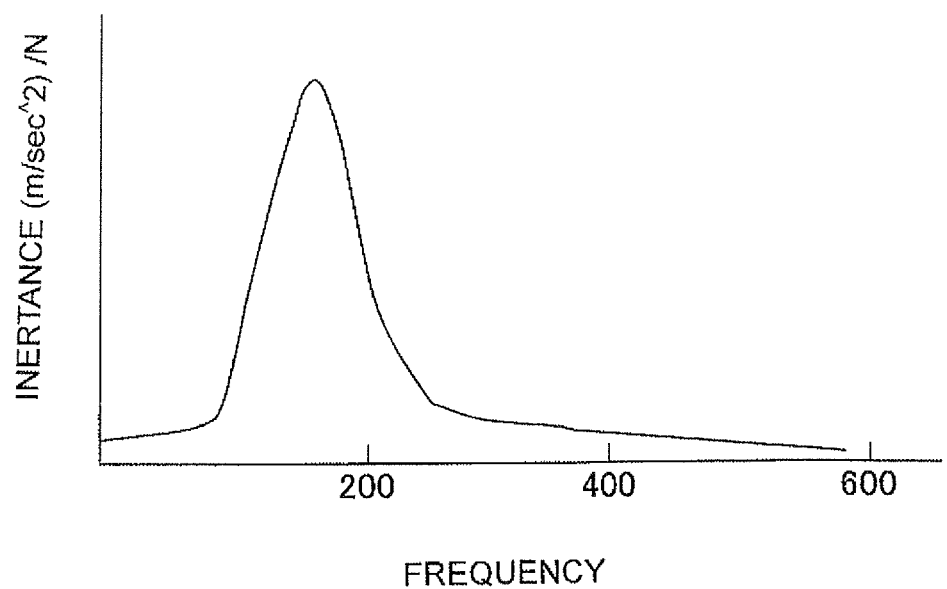
FIG. 7 is an explanatory drawing showing the vibration characteristic of a tool.

First, before machining starts, the values for determining the type of the chatter vibration described below and tool information such as the number of tool flutes are input through the input unit 13 to be stored beforehand in the storage unit. Then, when a command for rotation speed of the rotary shaft 3 is provided under control of an NC device not illustrated to start machining, the vibration sensors 2a to 2c constantly detect the time-domain vibrational acceleration in the rotary shaft housing 1, and the FFT calculation unit 11 implements fast Fourier analysis on the time-domain vibrational acceleration (S1) to obtain the peak values of the frequency-domain vibrational acceleration and the frequencies thereof (peak frequencies) (S2). Therefore, as shown in the graph of FIG. 5 for example, the plurality of peak values and peak frequencies can be obtained.

Next, in the determination unit 14, after the upper limit and the lower limit of the synchronizing type vibration range (e.g., a first type vibration) are obtained respectively using formulae (4) and (5) below for respective peak values (S3), the number of the peak values where the frequencies corresponding to the peak of each peak value are not included within the synchronizing type vibration range obtained using the peak frequencies (condition A) is counted, and whether the number is larger than a first set number set beforehand by the input unit 13 or not is determined (S4). When the number of the peak values satisfying the condition A is equal to or greater than the first set number (determined to be YES in S4), it is determined that "synchronizing type vibration" (e.g., a first type vibration) has occurred, and the result of the determination is displayed on the display unit 15 (S5).

[FORMULAE]

$$\text{Upper limit of the first vibration determination range} = \text{rotation speed}/60 \times (\lfloor \text{peak frequency} \times 60/\text{rotation speed} \rfloor) - \text{offset value} \quad (4)$$

$$\text{Lower limit of the first vibration determination range} = \text{rotation speed}/60 \times (\lfloor \text{peak frequency} \times 60/\text{rotation speed} \rfloor + 1) + \text{offset value} \quad (5)$$

$\lfloor \text{peak frequency} \times 60/\text{rotation speed} \rfloor$ in the formulae (4) and (5) is a floor function similar to that in the formula (2). Further, the offset value in the formulae (4) and (5) is a value obtained by the formula (6) below considering a rotation speed detection resolution and a frequency resolution.

[FORMULAE]

$$\text{Offset value} = \text{rotation speed detection resolution} \times (\lfloor \text{peak frequency} \times 60/\text{rotation speed} \rfloor)/60 + \text{frequency resolution} \quad (6)$$

On the other hand, when the number of the peak values satisfying the condition A is less than the first set number (determined to be NO in S4), it is determined whether or not the peak values are clustered close together within the natural type vibration range that is a predetermined frequency range to determine "natural type vibration" (e.g., a second type vibration). First, in order to exclude the cases where the peak values are clustered close together due to causes other than "natural type vibration," the peak values detected to be sideband are excluded (S6). In other words, when fast Fourier analysis on intermittent vibration such as machining vibration is implemented, peak values may possibly be detected at a frequency interval of an intermittent period. The intermittent period corresponds to the rotation period of the rotary shaft or the flute-passage period of the tool. Therefore, the detected peak values where the interval between frequencies corresponding to the peak of each peak value is the rotation frequency or the flute-passage frequency obtained by formulae (7) and (8) or is an integral multiple thereof are excluded.

[FORMULAE]

$$\text{Rotation frequency} = \text{rotation speed of the rotary shaft}/60 \quad (7)$$

$$\text{Flute-passage frequency} = \text{rotation speed of the rotary shaft} \times \text{number of tool flutes}/60 \quad (8)$$

After the peak values detected as the sideband are excluded as described above, the determination unit 14 extracts the peak values where the interval between frequencies corresponding to the peak of each peak value is a set interval or less (set beforehand by the input unit 13) out of the remaining peak values (S7), the average value of the peak frequencies of the extracted peak values is obtained, and the natural type vibration range that becomes a frequency band with a predetermined width (set beforehand by the input unit 13) having the average value as the median value is set (S8). Out of the extracted peak values, the number of the peak values where the peak frequencies are included within the natural type vibration range (condition B) is counted, and whether the number is greater than a second set number (set beforehand by the input unit 13) or not is determined (S9). When the number of the peak values included within the natural type vibration range is equal to or greater than the second set number, it is determined that "natural type vibration" (e.g., a second type vibration) has occurred, and the result of the determination is displayed on the display unit 15 (S10). On the other hand, when the number of the peak values included within the natural type vibration range is less than the second set number, it is determined that "regenerative chatter vibration" has occurred, and the result of the determination is displayed on the display unit 15 (S11). In displaying occurrence of "regenerative chatter vibration" in S11, it may be configured that, if the interval between the peak values is close to the rotation frequency obtained by the formula (7) or the integral multiples thereof, "rotational period type regenerative chatter vibration" is displayed, and if the interval between the peak values is close to the flute-passage frequency obtained by the formula (8) or the integral multiples thereof, "flute-passage period type regenerative chatter vibration" is displayed.

According to the vibration determination device 10 configured as described above, determination of the chatter vibration is executed by the method as described above for a plurality of peak values that appears when frequency-domain vibrational acceleration is obtained through fast Fourier analysis on time-domain vibrational acceleration. Therefore, when compared with related arts in which determination is executed using only the maximum value of frequency-domain vibrational acceleration, in machining at a low rotation speed and machining using a tool with small flute number in particular, the type of chatter vibration occurred can be accurately determined. In addition, "natural type vibration" occurring due to friction between a tool and a workpiece and an impact force caused by machining can be determined.

In determining "natural type vibration," in S6, the interval between frequencies taking the peak values is obtained, and out of the detected peak values, the peak values where the frequency interval is the rotation frequency or the flute-passage frequency or is an integral multiple thereof are excluded from the object of determination. Therefore, the natural type vibration range can be obtained more accurately in S8, and determination of "natural type vibration" with higher accuracy becomes possible.

Further, because the type of the chatter vibration accurately determined is displayed on the display unit 15, a worker can grasp the type of the chatter vibration easily and in a short time. Therefore, the worker can quickly take measures effective to the chatter vibration occurred (change and the like of the cutting condition such as the rotation speed and the depth of cut, for example). Thus, it is possible to improve the accuracy of the machined surface, suppress abrasion of a tool, prevent breakage of the tool, improve the manufacturing efficiency of the product, and so on.

The vibration determination device of the present invention is not limited to the aspects of the embodiments described above by any means, and configuration in relation with the detection unit, control in relation with determination of the type of the chatter vibration, control after determination, and the like can be modified as appropriate within the scope not departing from the object of the present invention.

For example, in the embodiment described above, it is configured that the vibrational acceleration of the rotary shaft is detected by the vibration sensors, however it may be configured so that the displacement and the sound pressure of the rotary shaft caused by vibration are detected and a stable rotation speed is calculated based on the displacement and the sound pressure. In addition, it is also possible to adopt a detector that detects the position and rotation of the rotary shaft and an electric current measuring instrument that measures a current of a rotary shaft motor and a feed shaft motor as the detection units.

It is also possible to configure so that a rotation speed control system (NC device) for controlling the rotation speed of the rotary shaft is included in the vibration determination device. Thus, after determining the type of the chatter vibration, a stable rotation speed capable of suppressing the chatter vibration may be calculated using a calculation formula for each type (for example, such the calculation formula as described in Japanese Unexamined Patent Application Publication No. 2008-290186), and the rotation speed control system automatically may change the rotation speed to the stable rotation speed.

Further, it may be configured so that, out of the peak values of the frequency-domain vibrational acceleration obtained in S2, the maximum value thereof and a predetermined threshold is compared, and S3 and onward is executed only when the maximum value is equal to or greater than the threshold, in which only the peak values that have exceeded the threshold may be the object of determination, or all of the peak values may be the object of determination. Further, when the natural frequency of the machine tool, tool and the like are known, it may be configured so that "natural type vibration" is determined by making a frequency band with a predetermined width having the natural frequency as a median value of the natural type vibration range and counting the number of the peak values where the peak frequencies are included within the natural type vibration range, and by using such the natural type vibration range, further improvement of the determination accuracy can be expected.

Furthermore, in the embodiment described above, determination by the condition B is executed after execution of determination by the condition A. However, it is possible to execute determination by the condition A after execution of determination by the condition B (that is, the order of S3 to S4 and S6 to S9 may be substituted to each other), and it is also possible to execute either one determination only.

In addition, in the embodiment described above, it is configured so that vibration in a rotary shaft of a machine tool is detected. However, it is also possible to detect vibration on the side not rotating (fixed side) to detect whether the chatter vibration has occurred or not. The technology can be applied not only to a machining center rotating a tool, but also to a machine tool such as a lathe and the like rotating a workpiece. Further, it will be needless to mention that the first set number and the second set number related to determination, the frequency band for setting the natural type vibration range, and the like may be changed appropriately according to the type, size and the like of the machine tool.

What is claimed is:

1. A vibration determination method for determining a type of chatter vibration occurring in a rotary shaft in a machine tool that has the rotary shaft rotating a tool or a workpiece comprising:
a first step for detecting time-domain vibration of the rotary shaft and rotation speed of the rotary shaft during rotation;
a second step for calculating frequency-domain vibration based on the time-domain vibration, and obtaining a plurality of peak values and peak frequencies corresponding to each of the plurality of peak values in the calculated frequency-domain vibration;
a third step for obtaining a synchronizing type vibration range for determining the type of the chatter vibration using the peak frequencies correspond to each of the plurality of peak values; and
a fourth step for determining whether the type of the chatter vibration is a forced chatter vibration of a synchronizing type vibration based on a relation between the peak frequencies and corresponding peak values and the synchronizing type vibration range obtained using the peak frequencies.

2. The vibration determination method according to claim 1, further comprising:
entering data including at least a first set value, a second set value and a number of tool flutes using an input unit; and
storing the data entered in a storage unit before starting a rotation of the rotary shaft of the machine tool.

3. The vibration determination method of claim 1, wherein the fourth step compares the number of the peak values having corresponding peak frequencies that are included in the synchronizing type vibration range to the first set number, and determines forced chatter vibration of the synchronizing type vibration has occurred when the number of peak values included in the synchronizing type vibration range exceeds the first set number.

4. A vibration determination method for determining a type of chatter vibration occurring in a rotary shaft in a machine tool that has the rotary shaft rotating a tool or a workpiece comprising:
a first step for detecting time-domain vibration of the rotary shaft and rotation speed of the rotary shaft during rotation;
a second step for calculating frequency-domain vibration based on the time-domain vibration, and obtaining a plurality of peak values and peak frequencies corresponding to each of the plurality of peak values in the calculated frequency-domain vibration;
a third step for obtaining a natural type vibration range for determining the type of the chatter vibration based on the plurality of peak frequencies; and
a fourth step for determining whether the type of the chatter vibration is a forced chatter vibration of a natural type vibration or a regenerative chatter vibration based on a number of the peak values having corresponding peak frequencies that are included in the natural type vibration range.

5. The vibration determination method according to claim 4, wherein in the third step, an interval between frequencies corresponding to each of the plurality of peak values is obtained, and the natural type vibration range is obtained after exclusion of the peak values corresponding to one of a rotation period of the rotary shaft and integral multiples thereof, and a flute-passage period of the tool and integral multiples thereof obtained by at least one of a formula (7) and a formula (8) from the calculated frequency-domain vibration:

Rotation frequency=rotation speed of a rotary shaft/60 (7)

Flute-passage frequency=rotation speed of a rotary shaft×number of tool flutes/60 (8).

6. The vibration determination method of claim 5, wherein the fourth step compares the number of the peak values having corresponding peak frequencies that are include in the natural type vibration range to the second set number, and determines forced chatter vibration of the natural type vibration of the forced chatter vibration has occurred when the number of peak values included in the natural type vibration range exceeds the second set number.

7. The vibration determination method of claim 6, wherein the fourth step determines a regenerative chatter vibration has occurred when the number of peak values is less than the second set number.

8. The vibration determination method of claim 7, wherein the method further comprises determining one of a rotational period type regenerative chatter has occurred when the interval between the peak values is close to the rotation frequency obtained using Formula (7), and a flute-type period type regenerative chatter vibration has occurred when the interval between the peak values is close to the flute-passage frequency obtained using Formula (8).

9. A vibration determination device that determines, in a machine tool that has a rotary shaft rotating a tool or a workpiece, a type of chatter vibration occurring in rotating the rotary shaft comprising:
a detection unit that detects time-domain vibration of the rotary shaft and rotation speed of the rotary shaft during rotation;
an FFT calculation unit that calculates frequency-domain vibration based on the time-domain vibration detected by the detection unit, and obtains a plurality of peak values and peak frequencies corresponding to each of the plurality of peak values in the calculated frequency-domain vibration;
a determination unit that obtains a synchronizing type vibration range for determining the type of the chatter vibration using the peak frequencies corresponding to each of the plurality of peak values, and determines whether the type of the chatter vibration is a forced chatter vibration of a synchronizing type vibration based on a relation between the peak frequencies and corresponding peak values and the synchronizing type vibration range obtained using the peak frequencies; and
a display unit that displays the type of the chatter vibration determined.

10. A vibration determination device that determines, in a machine tool that has a rotary shaft rotating a tool or a workpiece, a type of chatter vibration occurring in rotating the rotary shaft comprising:
a detection unit that detects time-domain vibration of the rotary shaft and rotation speed of the rotary shaft during rotation;
an FFT calculation unit that calculates frequency-domain vibration based on the time-domain vibration detected by the detection unit, and obtains a plurality of peak values and peak frequencies corresponding to each of the plurality of peak values in the calculated frequency-domain vibration;
a determination unit that obtains a natural type vibration range for determining the type of the chatter vibration based on the plurality of peak frequencies, and determines whether the type of the chatter vibration is a forced chatter vibration of a natural type vibration or a regenerative chatter vibration based on the number of the peak values where having corresponding peak frequencies that are included in the natural type vibration range; and
a display unit that displays the type of the chatter vibration determined.

* * * * *